United States Patent [19]

Kirsch

[11] Patent Number: 5,450,820
[45] Date of Patent: Sep. 19, 1995

[54] QUICK RELEASE DOG COLLAR

[76] Inventor: Steven P. Kirsch, 601 Dover Dr. (#7), Newport Beach, Calif. 92663

[21] Appl. No.: 308,560

[22] Filed: Sep. 19, 1994

[51] Int. Cl.6 .............................................. A01K 27/00
[52] U.S. Cl. .................................................... 119/865
[58] Field of Search ........................ 119/856, 863, 865

[56] References Cited

U.S. PATENT DOCUMENTS

| 2,612,139 | 9/1952 | Collins | 119/865 |
| 3,994,265 | 11/1976 | Banks | 119/865 |
| 4,044,725 | 8/1977 | Miller | 119/865 |

Primary Examiner—Cary E. O'Connor
Assistant Examiner—Thomas Price
Attorney, Agent, or Firm—Walter A. Hackler

[57] ABSTRACT

A pet collar device generally includes a connector mechanism for securing the two ends of a pet collar. Importantly, the device is designed to eliminate the risk of strangulation of a pet by its own collar in the event the collar becomes snagged on a protrusion. The connector mechanism includes a an automatic release mechanism which is designed to disconnect the ends of the collar when a force is exerted across the connector mechanism. Also included is a way to adjust the force response of the automatic release mechanism.

18 Claims, 1 Drawing Sheet

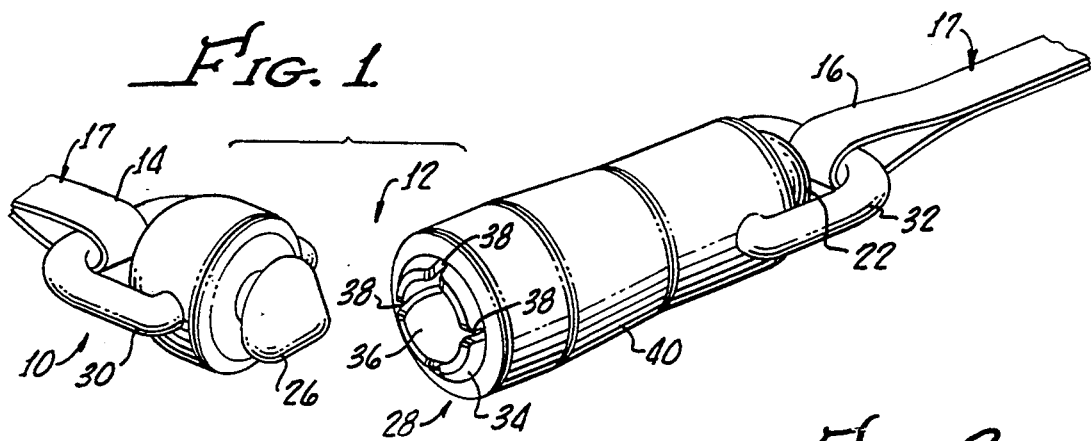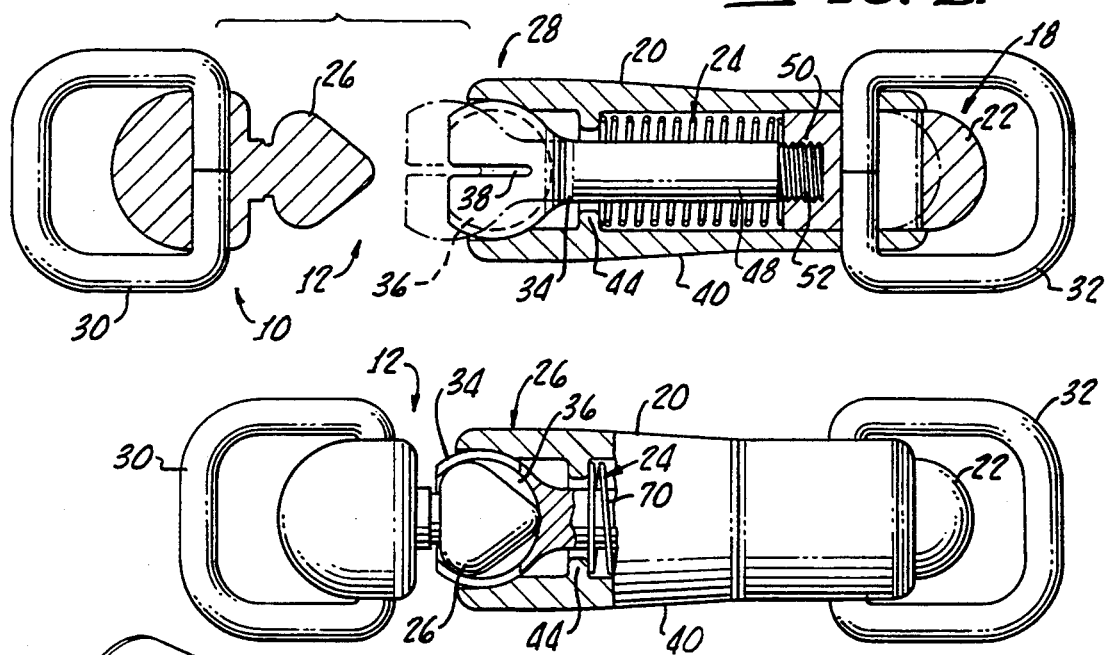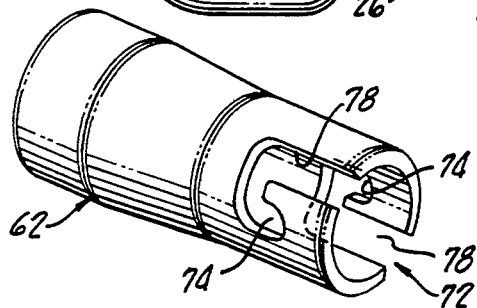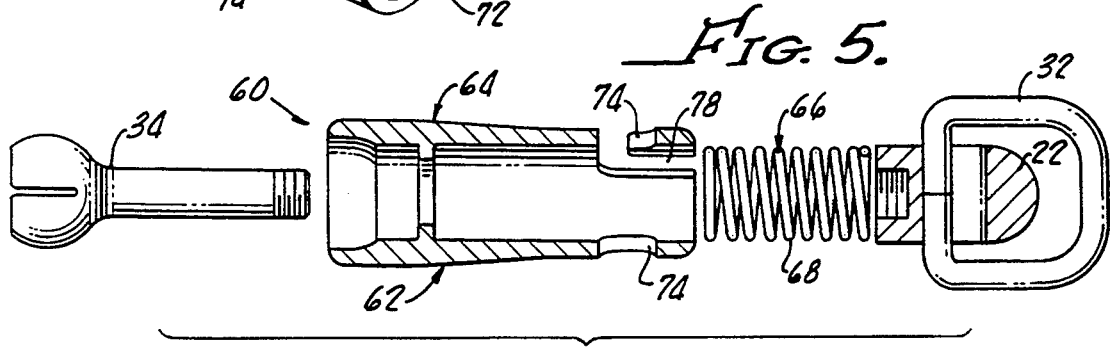

QUICK RELEASE DOG COLLAR

The present invention generally relates to a pet collar and in particular to a quick release connector mechanism for a dog or cat collar.

Pets, especially dogs and cats, are commonly fitted with collars. Often, local ordinances require pet owners to display ownership and registration information on their pets, usually in the form of-an identification tag attached to a collar. Although harness-type collars, that fit over a pet's shoulders and torso, are sometimes used, the most common collar is the neck collar.

Animal protection organizations have recommended to pet owners to ensure that a pet's collar is fitted properly. In particular, a collar should not be too slack, or loose around the neck. A collar that is dangerously slack may easily become snagged on a fence post or other obstruction and may fatally strangle the animal. This is particularly true for cats that tend to climb, jump and travel through trees and along narrow ledges. Despite their ability to almost always land on their feet, cats frequently jump, and less often fall, from high places. A cat wearing a collar is at risk since a protruding branch or other projection can catch his collar during a jump or fall. In his struggle to free himself from the snagged collar, the animal will suffocate.

Dogs as well can suffer the same fate. Furthermore, because pet owners are more likely to put a collar on a dog than on a cat, a dog may be the most common casualty to this type of accident.

Unfortunately, many pet owners are not aware of the risks presented by conventional pet collars. In particular, a pet owner may not take the necessary precautions of fitting a collar properly such that the risk of strangulation is minimized. In fact, an owner may purposefully fit a collar loosely, believing that a loose fitting collar is more comfortable to the animal than a snug collar. Without the knowledge that a slack collar is much more likely to become caught on a protrusion, many pet owners unknowingly place their beloved animals at an increased risk of accidental death.

As a pet matures, his size, weight and strength will change throughout his lifetime. Conventional pet collars are usually size adjustable, such that one collar will be designed to properly fit several different neck sizes. For example, one of the most common types of pet collars includes a fastening system that utilizes a typical buckle connection, much like a belt buckle. However, although conventional pet collars are typically size adjustable, they do not enable adjustment of the collar to suit a pet's changing weight and strength.

What is needed then is a pet collar that is safe for an animal to wear, and in particular, a collar that includes a quick release system that opens the collar when the an animal's body weight is exerted against it. Such a system is preferably adjustable to suit pets of the different weights and strengths.

SUMMARY OF THE INVENTION

Accordingly, the present invention is designed to meet the above needs. A pet collar device in accordance with the present invention generally includes a connector mechanism to releasably engage two ends of a pet collar together. Importantly, the connector mechanism includes both a hand-operated release means and an automatic release means.

In particular, the automatic release means is designed to disconnect the ends of the pet collar when an excess force is exerted across the connector mechanism. The force required to activate the automatic release means may be equal to approximately half of the pet's body weight. In effect, if the collar becomes snagged on a protrusion and the animal struggles or otherwise exerts force against the collar, the connector mechanism will disengage and the pet will be released. Thus, the present invention provides a pet collar that minimizes or eliminates the risk of strangulation.

Preferably, the connector mechanism is comprised of a projecting member and a complementary receiver for releasably engaging the ends of a collar strip. The automatic release means may be a resilient member, preferably a spring. Importantly, the spring, particularly its resiliency, determines the force response of the automatic release means. Thus, a pulling force in excess of a "selected force" will disengage the collar ends.

The receiver may comprise a socket member that is contoured to clamp the projecting member. Slots within the socket member enable expansion of a socket to accommodate the removable insertion of the projecting member therein. Furthermore, a receptacle may be provided for containing the socket member. The receptacle functions, in part, to prevent extraction of the projecting member in the absence of an excess force exerted across the connector mechanism.

The spring may be positioned within the receptacle. A berm, or shallow ledge provides means for containing the spring and biasing the socket member within the receptacle.

In recognition of the diversity of pets that may wear the pet collar device, another embodiment of the present invention provides a pet collar device including means to adjust the force response. The automatic release means will thus to operate properly when worn by any typical pet.

In particular, means are provided for altering the selected force required to disengage the connector mechanism. It has been determined that the selected force may be equal to about half of the weight of the pet wearing the collar, though it may differ depending upon the strength of the particular animal. The means to adjust the selected force may comprise a plurality of interchangeable springs of different resiliencies. Furthermore, means may be provided for easy removal and replacement of the differing springs.

BRIEF DESCRIPTION OF THE DRAWINGS

A better understanding of the present invention may be had by reference to the following description, taken in conjunction with the drawings in which:

FIG. 1 shows a perspective view of an embodiment of the present invention before coupling two ends of a pet collar;

FIG. 2 shows a cross-sectional view of the embodiment of the present invention shown in FIG. 1;

FIG. 3 shows a partially broken away view of the embodiment of the present invention shown in FIG. 1 in which the connector mechanism is engaged;

FIG. 4 shows an alternative embodiment of the present invention having a separable receptacle; and FIG. 5 shows an explored view of the alternative embodiment of the present invention, including a cross-sectional view of the separable receptacle.

DETAILED DESCRIPTION

Turning now to FIG. 1, there is shown a pet collar device 10 in accordance with the present invention. The device 10 generally includes connector means 12 for coupling and securing together two ends 14, 16 of a pet collar strip 17.

As can be more clearly seen in FIG. 2, the connector means 12 includes both a hand-operated release means 18 for enabling manual disengagement of the two ends 14, 16, and an automatic release means 20 for force-activated disengagement of the two ends 14, 16.

The hand-operated release means 18 may comprise a button member 22 which enables a pet owner to disengage the two ends 14, 16 of the collar by a simple push-button operation as hereinafter described in greater detail.

Importantly, the automatic release means 20 functions to prevent accidental strangulation of a pet by its own collar. Particularly, it is designed to disconnect the collar ends 14, 16 in response to a force exerted across the connector means 12 in excess of a selected force. The term "selected force" will hereinafter be used to describe a threshold force above which the automatic release means 20 will disengage the collar ends 14, 16. The selected force is preferably approximately equal to about half of the animal's body weight. However, as will be described hereinafter, the selected force may be set, or adjusted by the pet owner, in order to adapt the automatic release means to appropriately release the collar ends 14, 16 before the collar inflicts injury to the pet. This may be accomplished by selection of a spring 24 of a desired resiliency.

The connector means 12 may include a projecting member 26 attached to one end 14 of a pet collar by way of a ring 30, and a receiver 28 attached to the other end 16 of the pet collar by way of a ring 32. The receiver 28 provides means for releasably engaging the projecting member 26 in order to cooperatively secure the collar ends 14, 16 together.

Particularly, the receiver 28 may comprise a socket member 34, with a socket 36 having a shape that enables the socket member 34 to clamp firmly around the projecting member 26. Referring still to FIGS. 1 and 2, the socket member 34 may include slots 38 which provides a means for enabling the temporary expansion of the socket 36 in order to accommodate the removable insertion of the projecting member 26 therein. While the illustrated embodiment shows four equally spaced slots 38 within the socket member, any suitable number or configuration of slots enabling expansion of the socket may be utilized.

Preferably, the projecting member 26 has a tapered shape in order to enable insertion with minimal effort. More importantly, the preferred rounded cone-shape ensures minimal friction when the projecting member 26 is released from the socket member 34. This safety design facilitates the quick release of the collar in the event that the automatic release means 20 is prompted.

The receiver 28 preferably includes a receptacle 40 which provides a means for securing the projecting member 26 within the socket 36 in the absence of a pulling force in excess of the selected force. In other words, the receptacle 40 contains the socket member 34 and prevents expansion of the socket member 34 therein. The receptacle 40 may be a cylindrical, or other hollow shaped body that encases the socket member 34. The socket member 34 becomes partially or fully extracted from the receptacle 40 in response to a force in excess of the selected force. FIG. 2 illustrates the translational repositioning of the socket member 34 to a position (shown in phantom lines) that enables the removable insertion of the projecting member therein.

As hereinbefore described, a spring 24, or other resilient member provides a means for setting the desired selected force. The spring 24 may be housed within the receptacle 40.

In particular, the selected force is set by proper selection of spring resiliency. The selected force required to activate the automatic release means 20 depends upon the weight and strength of the particular animal that will be wearing the collar, and is preferably equal to about half of the animal's body weight. It is estimated that most typical dogs and cats fall within a body weight range of between about two pounds and 120 pounds. Thus, an estimated range of suitable spring resiliencies may thus correspond to a selected force range of between about one pound and about 60 pounds.

The pet collar device 10 also includes means for causing the spring 24 to bias the socket member 34 into the receptacle 40. In particular, this may take the form of an area of containment of the spring 24, defined on one end by a ridgelike structure, or berm 44, within the receptacle 40 and on the other end by the button member 22 disposed on the far side of the receptacle 40.

Furthermore, the socket member 34 may be comprised of a shaft 48 extending away from the socket 36. The shaft 48 may be positioned through the center of the spring 24, and the end of said shaft 48 may be connected to the button member 22, as shown in FIG. 2. The end 50 of the shaft 48 may include threads 52 for connection to the button member 22.

Thus, the hand-operated and automatic release means may be operate as hereinafter described. The hand-operated release means 18 enables a pet owner to press the button member 22 to cause translational movement of the shaft 48, which in turn compresses the spring 24 and forces the socket member 34 to protrude from the receptacle 40, as shown in phantom lines in FIG. 2. So positioned, the projecting member 26 can be removably inserted, facilitated by slots 38, therein. Upon release of the button member 22, the socket 36 returns to the interior of the receptacle 40 where it effectively clamps the projecting member. FIG. 3 illustrates the connector means 12 with the projecting member 26 engaged securely within the receiver 28.

The automatic release means 20 functions to disengage the projecting member in the event an animal becomes snagged by the collar and begins to struggle against it. In particular, a pulling force in excess of the selected force overcomes the resisting force of the spring 24 and will thus force the socket 36 to protrude from the receptacle 40. Subsequently, the slots 38 facilitates the expansion of the socket 36 and the quick release of the projecting member 26.

Importantly, the spring 24, or other resilient member, has a resiliency sufficient to maintain the bias of the socket member 34 in response to a pulling force of less than, or equal to, the selected force.

Another embodiment 60 of the present invention includes means for adjusting the selected force. FIGS. 4 and 5, of which identical reference numbers correspond to identical elements in the above described embodiment 10, show a pet collar device 60 including a means for adjusting the selected force. Particularly, a receptacle 62 is shown in FIG. 4 and an exploded view of a receiver 64 is shown in FIG. 5.

Preferably, the means for adjusting the selected force comprises a plurality of springs of different resiliencies. For purposes of illustration of this feature, the spring 66 in FIG. 5 is shown with heavier coils 68 than the coils 70 of spring 24 shown in FIG. 3. This represents two distinct spring resiliencies. Thus, by exchanging one spring 66 for another 24, the pet owner is able to change the selected force.

Importantly, means are provided for removing and replacing said springs. For example, FIG. 4 and 5 illustrates a receiver 64 including a bayonet base locking system 72. In order to access and remove the spring 66 from an assembled device, the button member 22 is pressed, enabling the protruding socket member 34 to be unscrewed and removed. Next, the ring 32 is disengaged from locking notches 74 within the receptacle 62, by a slight rotation of the button member 22. This enables the ring 32, along with the button member 22, to be completely removed from the receptacle 62 by way of entry slots 78 in communication with corresponding locking notches 74. With the button member 22 and ring 32 removed from the remainder of the receiver 64, the spring 66 is accessible and can be removed and replaced.

This feature of the present invention enables marketing of the device with the inclusion of several springs of different resiliencies so that a consumer can easily select the proper spring for his pet. Proper selection of a spring will ensure the device operates appropriately. For example, it is likely that a pet owner may purchase a pet collar device without knowing the weight of his pet. Thus, if he is provided with several different springs upon purchase of the pet collar device, he will be able to easily replace an unsuitable spring without the need to return to the seller and purchase another complete device. In addition, a pet owner may purchase a single pet collar device and change the spring as the animal grows in size and strength.

Furthermore, the interchangeable spring feature offers substantial benefits to sellers and distributors of the pet collar devices. Particularly, it minimizes a seller's risk of making a grossly inaccurate estimate of customer needs. For example, a pet store owner may order from a distributer, one hundred pet collar devices, with each device packaged to include a plurality of various springs. Thus, one device will suit several sizes of animals. Thus, he is able to avoid estimating the numbers of customers with particular sizes of animals. For example, he does not need to estimate numbers of customers with small dogs, distinguished from customers with average or large sized dogs. Moreover, because the springs are a relatively inexpensive part of the whole device, packaging several springs with each device is economically practical.

Although there has been hereinabove described a pet collar device for the purpose of illustrating the manner in which the present invention may be used to advantage, it should be understood that the invention is not limited thereto. Therefore, any and all modifications, variations, or equivalent arrangements which may occur to those skilled in the art, should be considered to be within the scope and the spirit of the present invention as defined in the claims.

What is claimed is:
1. A pet collar comprising:
a collar strip with two ends;
a connector means for securing said two ends together to form said collar for a pet, said connector means having
a hand-operated release means for enabling manual disengagement of said two ends; and
an automatic release means for disengaging said two ends in response to a force exerted across said connector means in excess of a selected force, said automatic release means comprising a spring.

2. The pet collar device according to claim 1 wherein the connector means further comprises a projecting member attached to one of said ends, and a receiving means, attached to the other of said ends, for releasably engaging the projecting member.

3. The pet collar device according to claim 2 wherein the receiving means comprises a socket member.

4. The pet collar device according to claim 3 wherein the socket member includes slot means for enabling expansion of the socket member to accommodate removable insertion of the projecting member therein.

5. The pet collar device according to claim 4 wherein the receiving means further includes receptacle means for containing the socket member and for preventing expansion of the socket member therein.

6. The pet collar device according to claim 5 further comprising means for causing the spring to bias the socket member into the receptacle means.

7. The pet collar device according to claim 6 wherein said spring has a resiliency sufficient to maintain the bias in response to a pulling force of less than between about one pound and about 60 pounds.

8. The pet collar device according to claim 7 wherein the hand-operated release means comprises a button means for compressing the spring in order to enable manual withdrawal of the socket member from the receptacle means.

9. A pet collar comprising:
a collar strip with two ends;
a connector means for securing said two ends of said collar strip, said connector means having
a hand-operated release means for manually disengaging said two ends;
an automatic release means for disengaging said two ends in response to a force across the connector means in excess of a selected force; and
a means for adjusting the selected force.

10. The pet collar device according to claim 9 wherein the means for adjusting comprises a plurality of springs of different resiliencies.

11. The pet collar device according to claim 10 wherein the means for adjusting comprises a means for removing and replacing said springs.

12. The pet collar device according to claim 11 wherein the connector means further comprises a projecting member attached to one of said ends, and receiving means, connected to the other of said ends, for releasably engaging the projecting member.

13. The pet collar device according to claim 12 wherein the receiving means comprises a socket member.

14. The pet collar device according to claim 13 wherein the socket member includes slot means for enabling expansion of the socket member to accommodate removable insertion of the projecting member therein.

15. The pet collar device according to claim 14 wherein the receiving means further includes receptacle means for containing the socket member and for preventing expansion of the socket member therein.

16. The pet collar device according to claim 15 further comprising means for causing the spring to bias the socket member into the receptacle means.

17. The pet collar device according to claim 16 wherein the resiliency of each spring is sufficient to maintain the bias in response to a pulling force of less than between about one pound and about 60 pounds.

18. The pet collar device according to claim 17 wherein the hand-operated release means comprises a button means for compressing the spring in order to enable manual withdrawal of the socket member from the receptacle means.

* * * * *